Aug. 17, 1954  C. E. WEST  2,686,429
FLUID PRESSURE GAUGE
Filed Nov. 23, 1948
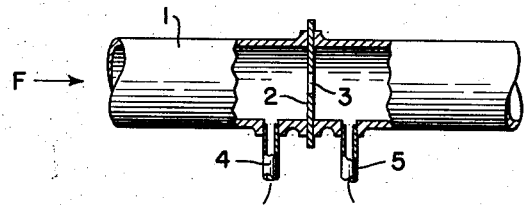
FIG. 1
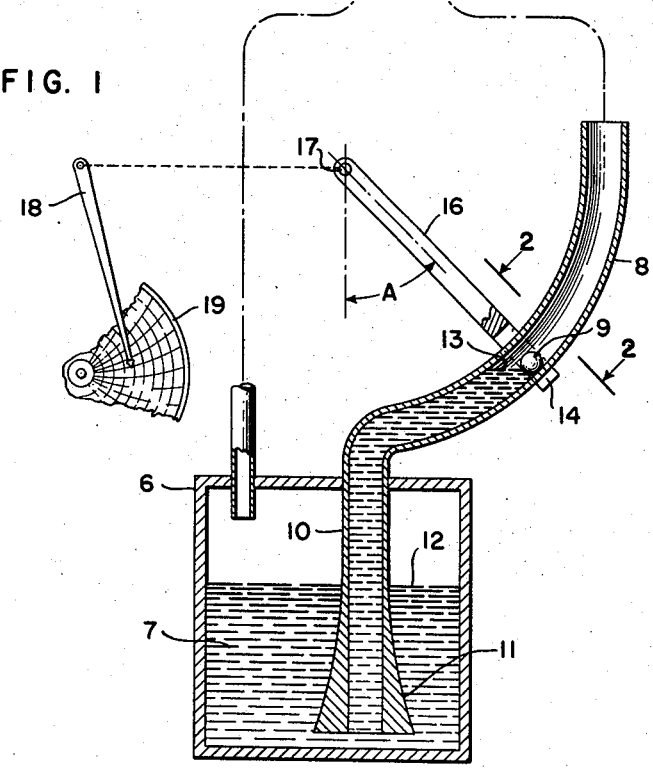
FIG. 2
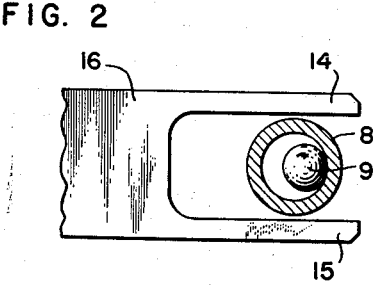
INVENTOR.
CHARLES E. WEST
BY
ATTORNEY.

Patented Aug. 17, 1954

2,686,429

UNITED STATES PATENT OFFICE 2,686,429

FLUID PRESSURE GAUGE

Charles E. West, Philadelphia, Pa., assignor, by mesne assignments, to Minneapolis-Honeywell Regulator Company, Minneapolis, Minn., a corporation of Delaware Application November 23, 1948, Serial No. 61,566

1 Claim. (Cl. 73—403)

This invention relates to an instrument for measuring flow of fluids, especially gases, by means of the differential pressure developed across a restricted orifice. This differential pressure is applied to the ends of a manometer, one portion of which is formed as the quadrant of a circle and another portion of which is flared adjacent one free surface of the mercury to give a correction.

It is an object of this invention to provide a flow meter having a free surface of liquid moving in a conduit shaped as a quadrant of a vertical circle.

It is a further object of this invention to provide a flow meter a portion of which is shaped in an upwardly extending curve and having a lever pivoted at the center of radius of said curved portion, there being a connection without direct engagement between the free end of said lever and a float on the free surface of the liquid within said curved portion.

A still further object of this invention is to provide a flow meter having a vertically extending curved portion, a float on a free surface of liquid movable in said curved portion, a lever pivoted at the center of curvature of said portion, and a magnetic connection between the free end of said lever and said float.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 is a diagram mostly in vertical cross section.

Figure 2 is a cross section on line 2—2 of Fig. 1 viewed in the direction of the arrows.

If the flow of a fluid, especially a gas, through a closed conduit is restricted, as by a thin plate having a central orifice, a differential pressure is developed. This differential pressure follows the law of squares in its operation. In other words, the square root of the differential pressure created across a restriction in a pipe is proportional to the velocity of the fluid flow. In order to provide an instrument, which indicates, records or controls the rate of flow by equal increments e. g. an evenly divided chart, a correction for or the extraction of this square root must be made. One convenient means of doing this is by the mathematical law of the versed sine. One expression of this law is: versed sine $A = 1 - \cos A$. That is to say, the versed sine is that part of the diameter of a unit circle between the foot of the sine and the arc, in other words, the remainder on subtracting the cosine of an angle from one. This law is that the versed sine of an angle proportional to a quantity almost exactly equals the square root of the same quantity particularly at small angles. For example, within an angle of 50 degrees the versed sine varies within 3 percent, of the square root parabolic curve plotted to the same scale.

In applying the law of versed sines to a manometer having a portion shaped as the quadrant of a circle whose lower end is tangent to the horizontal and whose upper end is tangent to the vertical, means may be employed to insure that the height of the free surface of the liquid in the quadrant above a lower, reference level increases as the rate of flow increases. One such means is a solid having a surface of revolution having a vertical axis and a horizontal cross section which decreases in an upward, vertical direction. A free surface of a liquid cooperates with the surface of revolution and will have the cross sectional area of its free surface reduced as the level of the liquid falls.

A flow meter applying the versed sine law may be constructed according to the diagram shown in the drawings. In such a meter a conduit 1 is provided for the flow of a fluid, especially a gas, to be measured. The fluid is passed through the conduit in the direction of the arrow F. An orifice plate 2 has a central opening 3. A pipe 4 is connected to the conduit 1 on the side of the on-coming liquid. A pipe 5 is connected to the conduit 1 on the side of the off-going liquid. The other end of conduit 4 leads through the top of a reservoir 6 containing a suitable amount of a heavy liquid 7 such as mercury. The opposite end of pipe 5 is connected to the upper end of a quadrant 8 whose lower end is substantially tangent to the horizontal and whose upper end is substantially tangent to the vertical. When a differential pressure is applied to the manometer through pipes 4 and 5, the free surface 13 of the liquid rises in the quadrant 8 and moves a ball 9 which floats thereon.

The lower end of quadrant 8 communicates with the reservoir 6 adjacent the bottom thereof by means of a vertical portion 10 having a bore through it approximately equal to the bore of the quadrant 8. Vertical pipe 10 has its lower outer surface formed in a surface of revolution 11 whose axis is vertical and coincident with that of vertical pipe 10. Surface of revolution 11 has its maximum horizontal cross section at the bottom thereof and its minimum horizontal cross section at the top. The free surface 12 of the mercury 7 cooperates with the surface of revolution 11.

Float 9 may be a magnetized steel ball so as to cooperate with a horse shoe magnet having poles 14 and 15 and carried by a lever 16 which is pivoted on a rotatably mounted shaft 17. On shaft 17 may be mounted an indicating pointer, a recording pen arm, or a controlling cam. Such a pointer, a pen, or a cam are well understood. Although a pen arm 18 cooperating with a chart 19 is shown in the drawing, a simple indicating pointer or a cam may be substituted for this pen arm.

The angle A is the angle between the vertical and the axis of lever 16. Therefore, the height of the free surface of the mercury in tube 8 above its lower end is equal to one minus cosine A (1−cos A) which is the versed sine. The versed sine is approximately equal to the square root of the variable represented by the angle A. The surface of revolution 11 corrects for the amount by which the versed sine differs from the true square root value of the differential pressure. Thus lever 16 is moved by equal increments or steps in accordance with the flow of fluid through conduit 1 even though this flow varies as the square law. The square root of the flow has been extracted by the curvature of quadrant 8 plus the correction applied by surface of revolution 11.

Although it is preferred to make both float 9 and pole pieces 14 and 15 of permanently magnetized material, either may be made of soft, readily magentized iron so as to serve as a flux path for the magnetism generated by the other.

As is best shown in Figure 2, the pole pieces 14 and 15 extend away from shaft 17 beyond quadrant 8 and beyond float 9 therein. Pole pieces 14 and 15 therefore attract float 9 toward the outer surface of quadrant 8 and prevent the float from sticking or binding in the quadrant as might happen especially when the free surface 13 of the mercury 7 is at a low level adjacent the horizontally tangent portion of quadrant 8.

The operation of this flow meter is as follows: When a fluid passes through conduit 1 in the direction of arrow F a differential pressure is developed across the orifice 3 in plate 2 and is applied, by means of pipes 4 and 5 to the free surfaces 12 and 13 of the enclosed body of mercury 7. Since the pressure in pipe 4 is high in comparison with that in pipe 5, mercury surface 12 is depressed while mercury surface 13 is elevated through vertical column 10 and quadrant 8. Mercury surface 13 carries float 9 on it. The magnetic interaction between float 9 and pole pieces 14 and 15 rocks arm 16 about its pivot and thereby turns shaft 17 and any parts, such as an indicating pointer, a recording pen, or a controlling cam, carried by shaft 17.

While in accordance with the provisions of the statutes, I have illustrated and described the best form of the invention, now known to me, it will be apparent to those skilled in the art that changes may be made in the form of the apparatus disclosed without departing from the spirit of the invention as set forth in the appended claims, and that in some cases certain features of this invention may sometimes be used to advantage without a corresponding use of other features.

Having now described my invention what I claim as new and desire to secure by Letters Patent is as follows:

A meter responsive to elastic fluid pressures comprising a manometer having a hollow interior containing a body of mercury and spaces above the free surface of said mercury and including: a first pipe, a second pipe and a third pipe, said pipes each having a bore through it connected in series with the bores through the other pipes; said first pipe extending vertically in the shape of a quadrant of a circle whose lower portion is substantially tangent to the horizontal and whose upper portion is substantially tangent to the vertical, the transverse cross section of said first pipe being a ring of uniform diameter; a vertical second pipe in the shape of a solid of revolution and having a bore through it having an internal diameter equal to the internal diameter of the bore through said first pipe, the top end of said second pipe being connected to the lower portion of said first pipe, the transverse cross section of the second pipe being a ring increasing in external diameter from the top to the bottom; a third pipe extending vertically in the shape of a hollow cylinder closed at the top and closed at the bottom beneath the lower end of said second pipe, the transverse cross section of said third pipe being a ring of uniform diameter larger than said second pipe, the vertical axis of said second pipe and of said third pipe being parallel, the second pipe extending through the top of and into said third pipe and the lower end of said second pipe terminating closely adjacent the bottom of said third pipe; conduits connected one to said first pipe and one to said third pipe and each applying to one free surface of the body of mercury in said pipes a pressure caused by the fluid whose pressure is to be measured so that the differential between said pressures causes the free surfaces of the mercury to assume different levels; a float supported on the free surface of the mercury within said first pipe; a lever pivotally mounted at the center of curvature of said quadrant-shaped first pipe; and interacting magnetic members constituted by said float and by the free end of said lever, whereby the rise and fall of said float rocks said lever about its pivot through an angle the versed sine of which is proportional to the square root of the differential pressure plus a correction due to the shape of the external surface of said second pipe, so that the angular position of said pivoted lever indicates substantially said pressure differential with the square root extracted.

References Cited in the file of this patent

UNITED STATES PATENTS

| Number | Name | Date |
|---|---|---|
| 1,228,325 | Joachim | May 29, 1917 |
| 1,396,560 | Dickinson | Nov. 8, 1921 |
| 1,459,212 | Kath | June 19, 1923 |
| 1,471,814 | Weller | Oct. 23, 1923 |
| 1,668,457 | Kath | May 1, 1928 |
| 1,723,512 | Jonas | Aug. 6, 1929 |
| 2,003,839 | Smith | June 4, 1935 |

FOREIGN PATENTS

| Number | Country | Date |
|---|---|---|
| 114,340 | Great Britain | Mar. 28, 1918 |
| 500,466 | France | Dec. 17, 1919 |
| 178,865 | Great Britain | Dec. 7, 1922 |
| 228,175 | Great Britain | Nov. 19, 1925 |
| 266,705 | Great Britain | June 9, 1927 |
| 470,819 | Germany | Jan. 30, 1929 |
| 678,132 | France | Dec. 23, 1929 |
| 534,153 | Germany | Sept. 23, 1931 |